US008112328B2

(12) United States Patent
Schmeling et al.

(10) Patent No.: US 8,112,328 B2
(45) Date of Patent: Feb. 7, 2012

(54) SECURE AND MEDIATED ACCESS FOR E-SERVICES

(75) Inventors: Garth F. Schmeling, Boise, ID (US); Travis W. Loyd, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 2065 days.

(21) Appl. No.: 10/011,524

(22) Filed: Nov. 5, 2001

(65) Prior Publication Data
US 2003/0088429 A1 May 8, 2003

(51) Int. Cl.
*G07F 19/00* (2006.01)
(52) U.S. Cl. ......... 705/34; 370/352; 370/389; 370/392; 370/546; 705/35; 709/201; 709/203
(58) Field of Classification Search ............... 706/34
See application file for complete search history.

(56) References Cited

U.S. PATENT DOCUMENTS

| 5,504,677 | A | * | 4/1996 | Pollin ............................. 705/45 |
| 5,680,461 | A | | 10/1997 | McManis |
| 5,708,422 | A | * | 1/1998 | Blonder et al. ............. 340/5.41 |
| 5,815,665 | A | | 9/1998 | Teper et al. |
| 5,905,736 | A | * | 5/1999 | Ronen et al. ................... 370/546 |
| 6,119,152 | A | | 9/2000 | Carlin et al. |
| 6,185,545 | B1 | * | 2/2001 | Resnick et al. ................. 705/40 |
| 6,205,466 | B1 | | 3/2001 | Karp et al. |
| 6,216,159 | B1 | | 4/2001 | Chintakrindi et al. |
| RE37,258 | E | | 7/2001 | Patel et al. |
| 6,267,292 | B1 | * | 7/2001 | Walker et al. ................. 235/379 |
| 6,408,284 | B1 | * | 6/2002 | Hilt et al. ......................... 705/40 |
| 6,477,578 | B1 | * | 11/2002 | Mhoon ........................ 709/229 |
| 6,748,367 | B1 | * | 6/2004 | Lee .................................. 705/66 |
| 6,910,065 | B2 | * | 6/2005 | Matsuki ........................ 709/203 |
| 6,915,279 | B2 | * | 7/2005 | Hogan et al. ..................... 705/64 |

FOREIGN PATENT DOCUMENTS

| GB | 2349715 A | 11/2000 |
| GB | 2376772 A | 12/2002 |
| WO | WO 00/55777 | 9/2000 |
| WO | WO 01/48628 | * 7/2001 |
| WO | WO01/82196 | 11/2001 |

OTHER PUBLICATIONS

Richardson, Robert. The Net Is Out There Beyond Unified Messaging.(Industry Trend or Event). Computer Telephony , vol. 8 , No. 7 , p. 46 , Jul. 2000.*

* cited by examiner

*Primary Examiner* — F. Zeender
*Assistant Examiner* — Fawaad Haider

(57) ABSTRACT

A system for providing secure access for a user to network accessible services. The system comprises a client software agent to generate a services request that is determined by a user. A services software agent is included and the service software agent is in electronic communication with the client software agent, to receive and fulfill the services request. A permissions software agent has a listing of user permissions for the network accessible services. The permission software agent is in communication with the services software agent and the services software agent requests user permissions from the permissions services agent so as to enable activation of the network accessible services selected by the user.

1 Claim, 15 Drawing Sheets

The user has received a secure transaction with the selected services.

End: The user has received secure confirmation and logging of the transaction

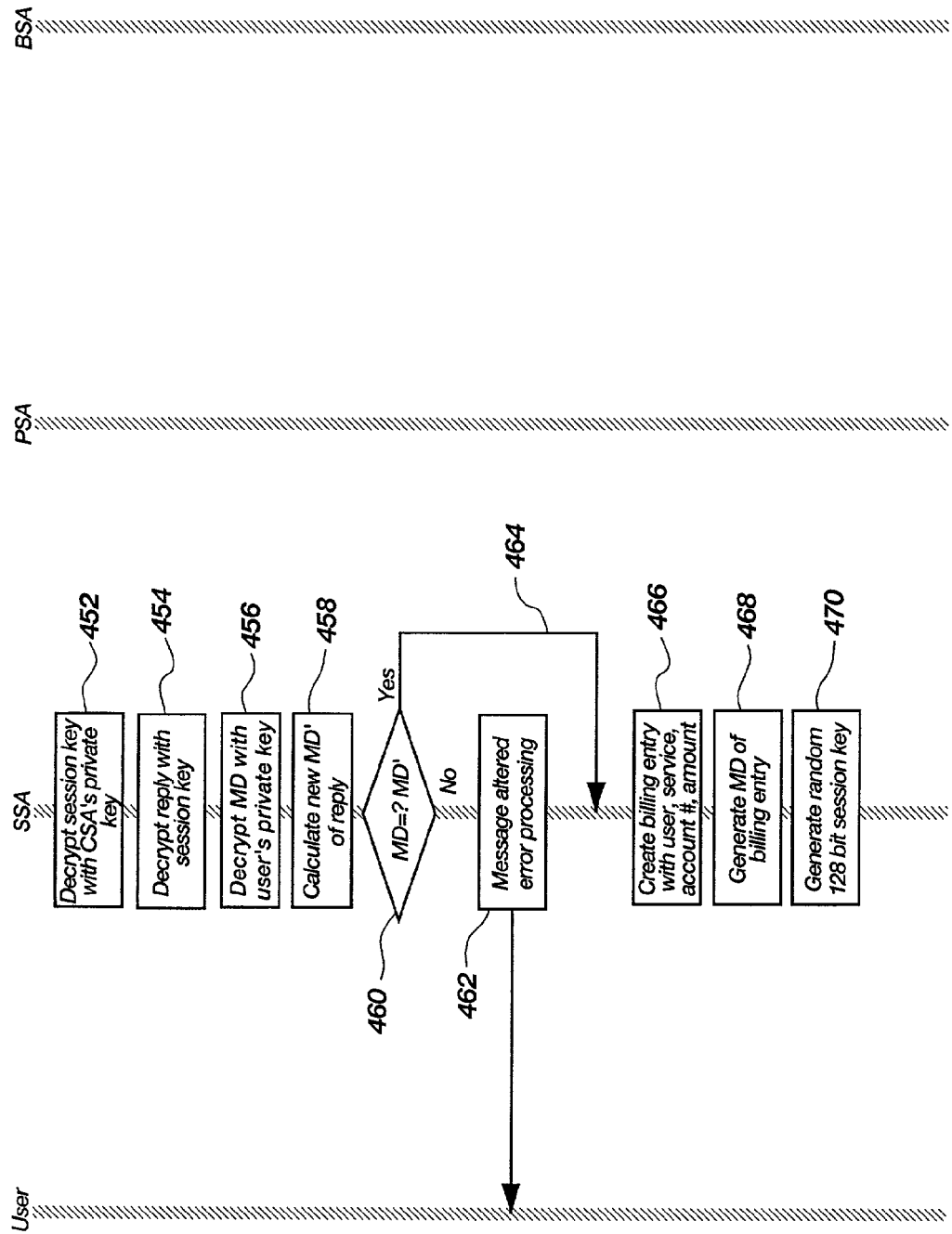

SECURE AND MEDIATED ACCESS FOR E-SERVICES

FIELD OF THE INVENTION

The present invention relates generally to secure and private access to electronic services. More particularly, the present invention relates to providing electronic services with secure electronic service requests, verification, and billing.

BACKGROUND

In the emerging world of the Internet, virtual private networks (VPNs), and access to e-services over a network, there is a need for secure and authenticable access to those services. Recently, it has become more common to attach peripheral devices with network accessible services to a TCP/IP network or attach a service-providing device to the Internet. An example of this is a TCP/IP enable copier or printer.

Currently, in a large enterprise or work group, there is no authorization check to be certain that users have access rights to electronic services that are attached to the network. In addition, there is no authentication check to be certain that users are who they say they are for access to e-services such as printers.

It is also important that the requests for e-service transactions provide confidentiality or privacy of e-service data. Currently, e-service requests do not provide a confidential or private interface in accessing the services requested. Those who desire to defraud e-services systems can also impersonate real users and access the e-services.

Secure transaction requests must also be available when requesting e-services. Many networks do not secure their e-services and the transaction requests can be intercepted or even modified. Hackers can use the Internet to infiltrate private networks and illegitimately use the e-services. Malicious individuals can also intercept and use the information destined for those e-services. This is true of credit card information, sensitive documents, or other types of information sent to network accessible services.

SUMMARY OF THE INVENTION

The invention provides a system for secure user access to network accessible services via a network. The system comprises a client software agent to generate a services request that is defined by a user. A services software agent is included and the service software agent is in electronic communication with the client software agent, to receive and fulfill the services request. A permissions software agent has a listing of user permissions for the network accessible services. The permission software agent is in communication with the services software agent and the services software agent requests user permissions from the permissions services agent in order to activate the network accessible services defined by the user.

The invention also provides a method for providing secure user access to network accessible services via a network. A first step is generating a services request as defined by a user through a client software agent. Next is receiving the services request at a services software agent. Another step is retrieving a user permissions listing for network accessible services from a permissions software agent. An additional step is facilitating the fulfillment of the network accessible services based on the user permissions listing received from the permissions software agent.

In accordance with another aspect of the present invention, a method is included for providing secure billing of network accessible services provided to a user via a network. A first step can be generating a billing request from a services software agent after network accessible services have been completed via the services software agent. A next step is sending the billing request to a permissions software agent. Another step is creating a billing reply including the user's billing account number using the permissions software agent. A following step is transmitting the billing reply to the billing software agent.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

FIG. 6C is a continuation of the flow charts in FIGS. 6A and 6B.

DETAILED DESCRIPTION

Figure 1:
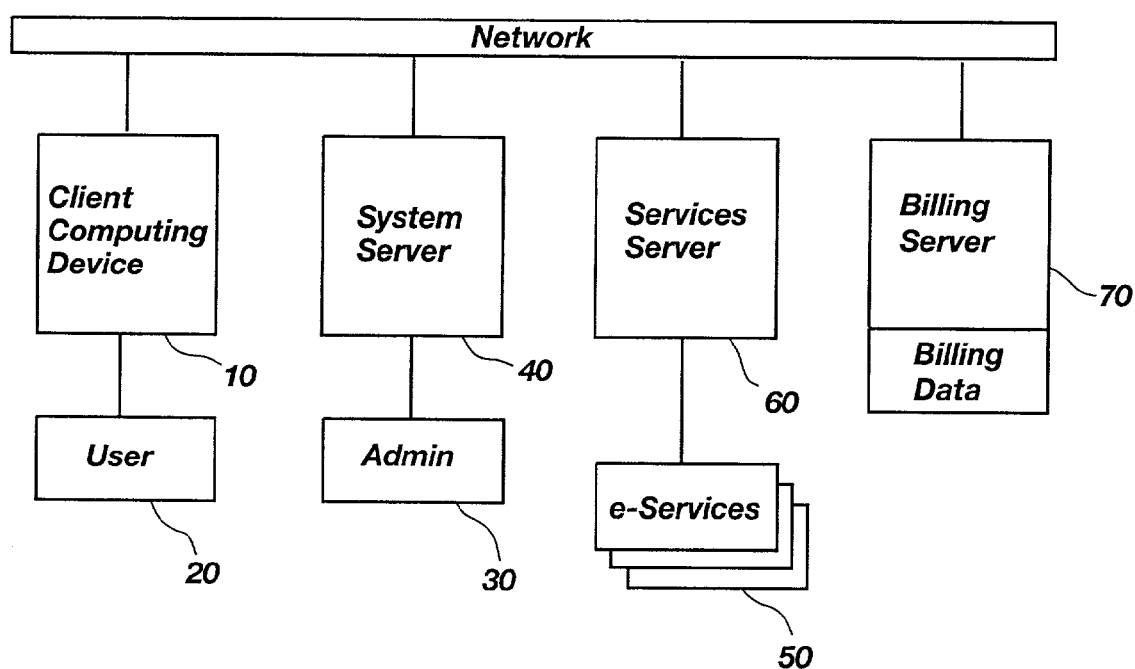
FIG. 1 is a block diagram depicting the relationship between several components in the secure e-services system and method.

For purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

It has been recognized that it would be advantageous to develop a system and method that allows users to access e-services over a network, provides authentication for users, and provides privacy for a transaction and its data. Such a system can also enable security to guarantee that the transaction and data have not been modified in transit, and to guarantee that the transaction cannot be repudiated. In addition, secure billing for the use of the service can be provided.

This system and method provides secure, mediated access to e-services such as remote printing services, communication services, display services, or other services provided through a web site. Specifically, there may be a printer, copier, plotter, long distance voice service, or fax server that is attached to a network in a large corporate office building. For example, users from different corporations, organizations or sub-organizations in the building can use the system to print to a high-speed color laser copier/printer and then be billed separately for that printing. This allows the organizations to share the cost of high quality printing but divide the cost between multiple organizations.

Since the printer will be available to multiple organizations across an intranet or the Internet, it provides the opportunity for users to try to defraud the system. Even an organization specific printer that is used within an organization often needs to have the cost of that peripheral allocated between multiple divisions in the corporation based on use.

Furthermore, some servers or web sites provide access to other types of services such as product delivery, brokering or similar services. These types of Internet enabled services also need authenticated user requests. For example, a user may purchase a number of items from an office supply web site and then request that the items be delivered to them the same day. This type of requested services should be immediately authenticated and not possible for the user to reject.

Accordingly, the present invention can authenticate users and the system can positively determine that users are who they say they are. The system can also check the users' authorization and determine if they have authority to request a certain transaction. Privacy safeguards can be provided through the present system so that the data and payment information are confidential. In addition, the system provides security through multiple levels of encryption and the separation of authentication data from the services server. This preserves the integrity of the data and permits the system to detect modifications of the transaction data.

Another important part of a services request transaction is to determine whether a binding agreement has been made between the service requester and the e-service provider (or peripheral owner). The present system and method provides non-repudiation of the transaction, which means that neither party can later say that the transaction did not happen. Finally, the system can provide secure billing of the services transaction.

Referring now to FIG. 1, a high level overview of the invention will be discussed. The user 20 is located at a client computing device 10 and the end user can have data files that he would like have services performed for, or other network accessible services he would like to request. The client computing device provides the user with access to the network, and allows the user to create document files and store them. A browser can be included with the client computing device for accessing networked content from servers and other devices on the network or Internet. The client's browser displays networked content to the user and allows him to interact with it. The client computing device also includes a "client software agent" (CSA).

Examples of electronic services or network accessible services that the user may desire to perform on their data files include printing, creating multiple document copies, publishing, binding the documents, and having the documents delivered to different locations. In the case of a fax machine, the user can fax the document to different fax destinations. The user uses an available service or e-service over the Internet or network to accomplish the tasks that the user needs.

The system administrator or IT administrator 30 has knowledge of the e-services that are available over the network. He sets up permissions on the system server 40 giving some users access to services and denying other users that same access. The system administrator also sets up the client software agents on the client machines 10 and configures them to point to servers on the network. The system server performs normal server functions but also stores group permissions and access rights for users to devices and services. The services are preferably accessed or enabled through the system server. A user interface (UI) is provided in the system server that allows the administrator to set those permissions, and the system server contains a "permissions software agent" (PSA).

One advantage of storing the permissions on a server separate from the services server is that information from both servers must be used to initiate the transaction. This increases the security level for the services. An additional advantage is that the system server stores the permissions to provide scalability and save space on the services server. This way an unlimited number of users can access the services server because the authentication is performed locally for each user at the system server level.

The services server 60 provides access to the e-services and performs normal server functions too. It includes a services software agent (SSA) and a logging software agent. The SSA receives the data files that are sent to it for processing and then forwards the processed files to the appropriate peripheral for execution of the services 50. For example, a processed file can be forwarded to the printer for output. The e-services can be software applications or peripheral devices accessible through the services server that provide a service to the end user.

The logging software agent tracks the transactions that take place. Each document or data request that is processed by the services server 60 will be logged into the database. The logging software can determine whether the service was cancelled or terminated before it was performed.

The billing server 70 provides a secure billing service for the users and the e-service. It stores billing data in a database and also includes a billing software agent (BSA). The billing agent may periodically send electronic bills to the users, companies or entities using the electronic services. For example, the billing agent can bill for the services monthly or bimonthly.

One advantage of this system is that users gain access to e-services but the chance of unauthorized service requests or illegitimate access is greatly reduced. The permissions authorization through an independent system server 40 significantly reduces the possibility of spoofing or user impersonation. This is because that user's identity is cross-referenced through an encrypted interchange with the system server that stores pre-configured user identities. Even if a hacker desires to impersonate a user, the hacker would have to gain access to not only the services server but also to the system server. Both the system server and services server validate the users identity in this situation.

Another advantage of the present system is that it keeps service transactions and their data private via encryption. The chance for theft or misuse of the data is greatly reduced through using encrypted messages. Specifically, the chance for theft and modification of the transaction while it is being transmitted is eliminated.

Figure 2A:
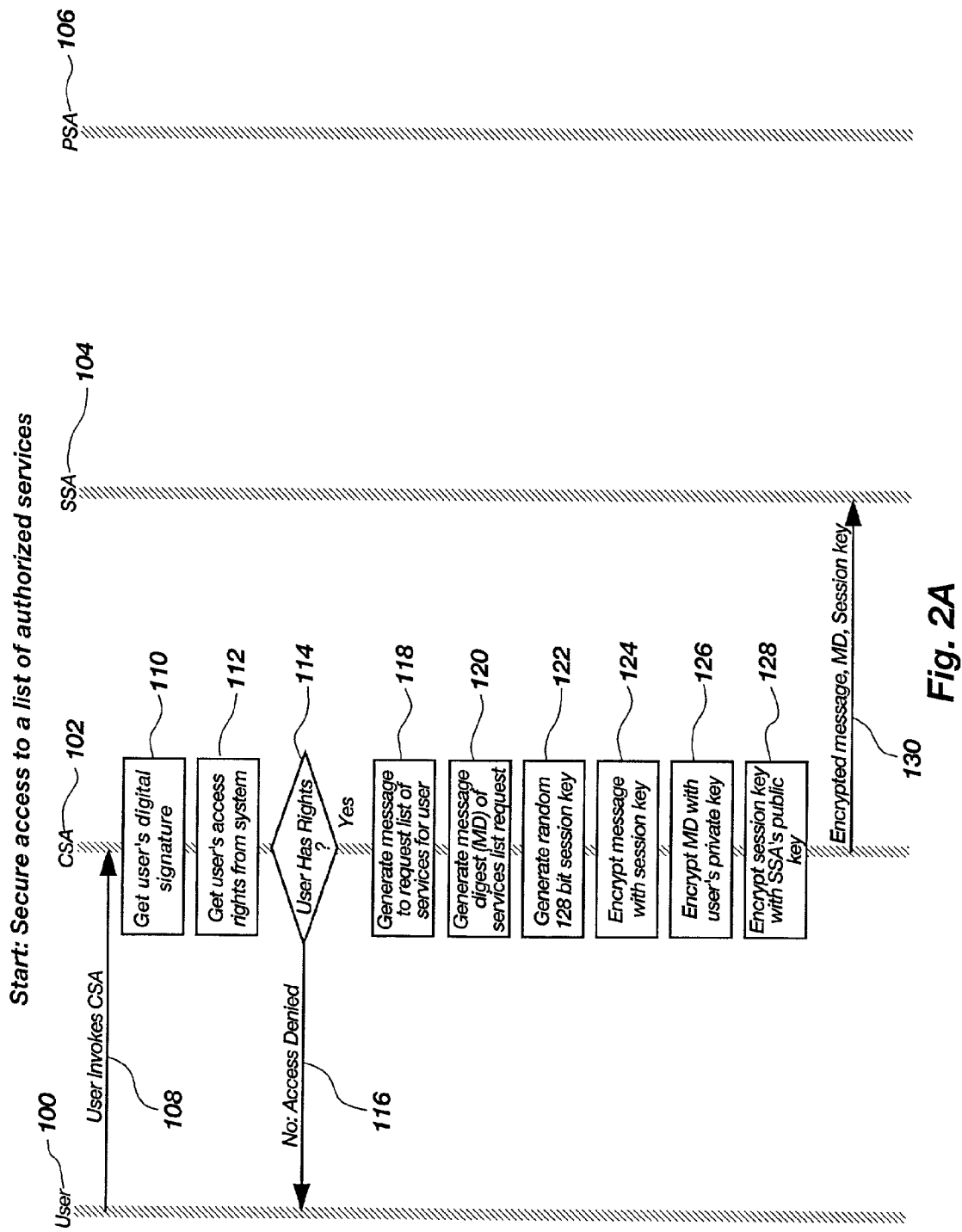
FIG. 2A is flow chart showing a method for secure access to a list of authorized services.
Figure 2B:
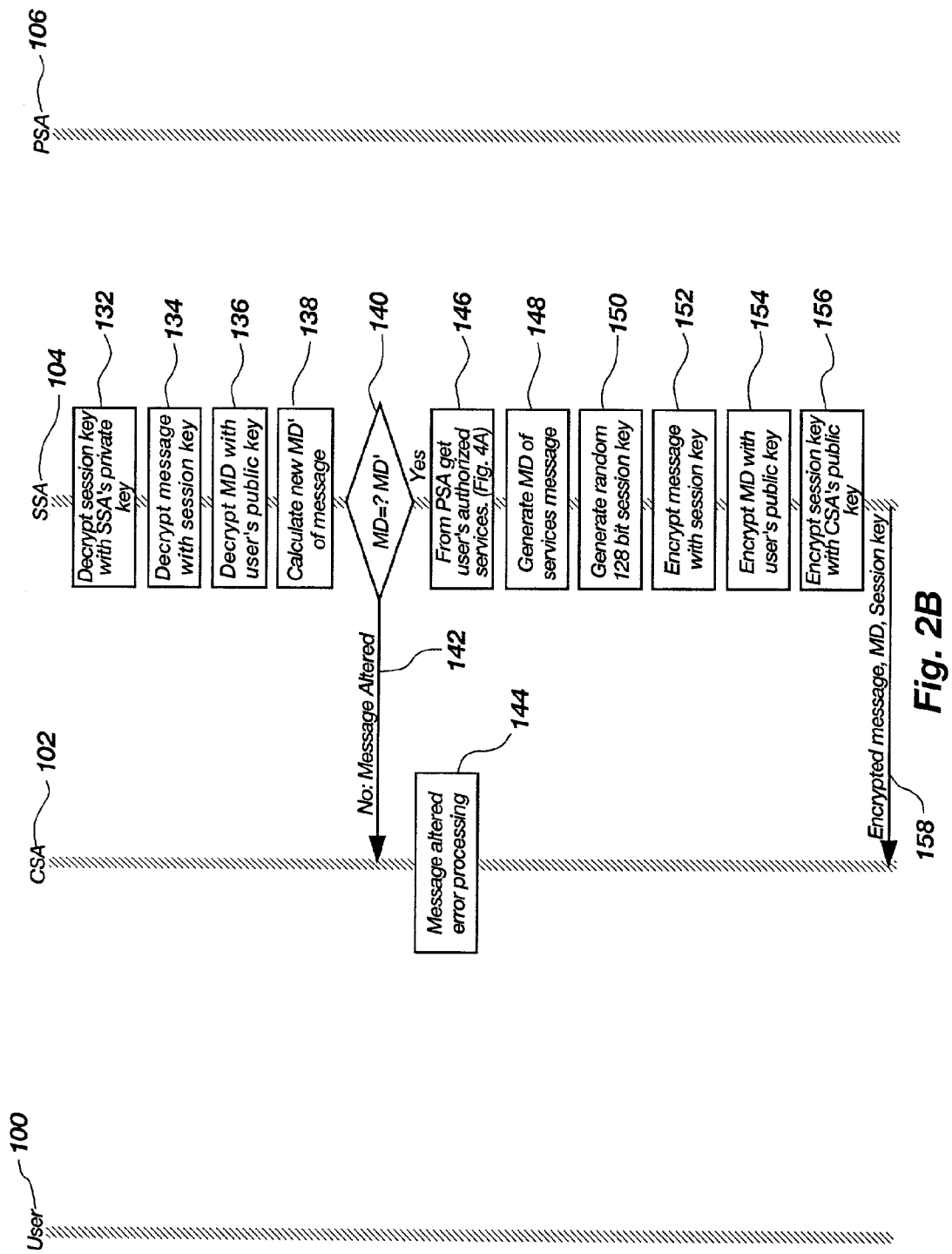
FIG. 2B is a continuation of the flow chart in FIG. 2A.
Figure 2C:
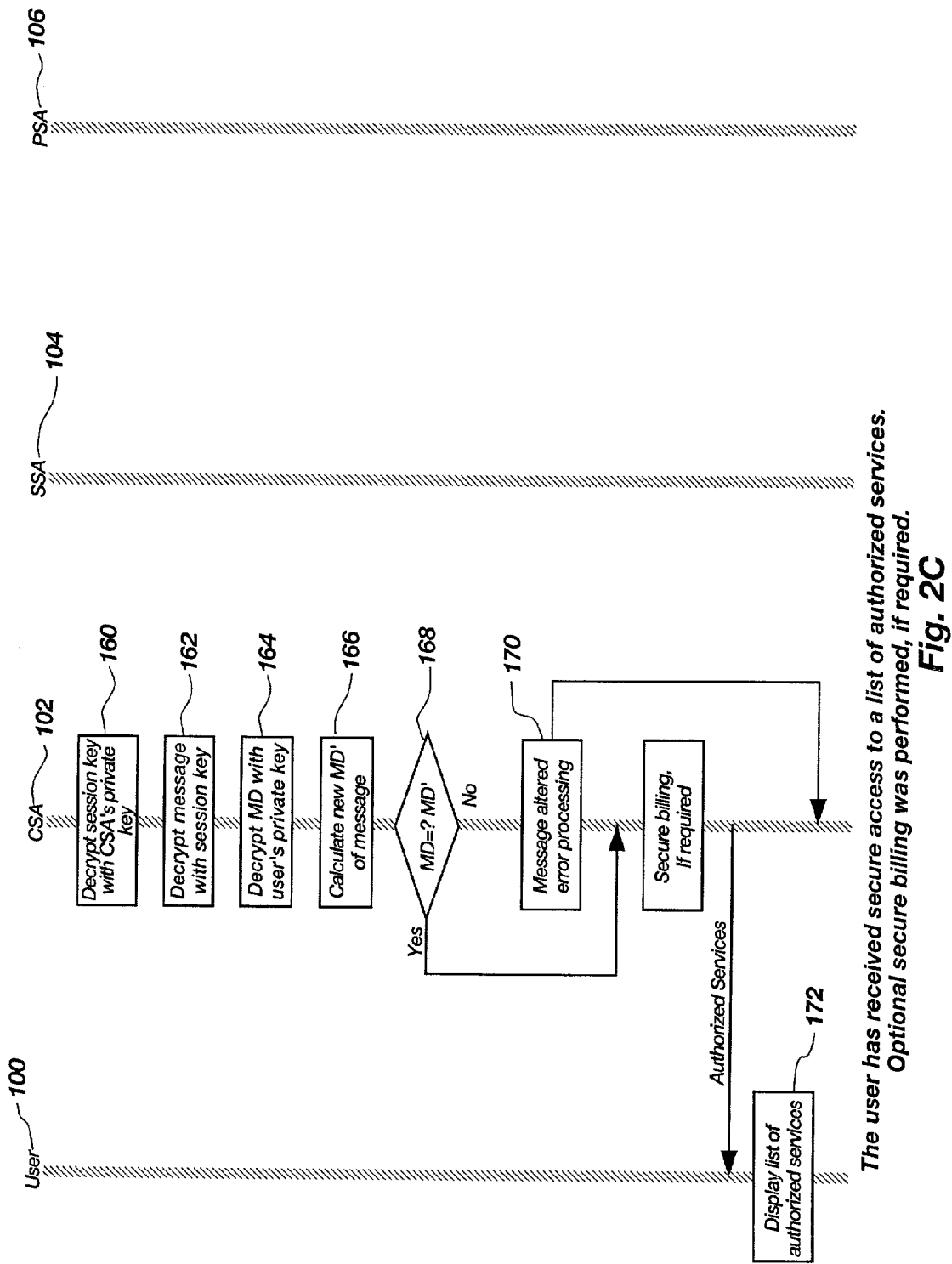
FIG. 2C is a continuation of the flow charts in FIGS. 2A-B showing that a user has received secure access to a list of authorized services.

A more detailed discussion of the communications between the separate software agents will now be presented. Referring now to FIG. 2A, a flow chart illustrates the secure access to a list of authorized services. To provide secure access to a list of authorized services, the user 100 invokes the client software agent (CSA) 108. The CSA 102 may be invoked through an icon on the desktop, opening a file through a network browser, or the user may right click on a file and select the CSA. In order to communicate with the services server, the CSA has been configured with the IP address of the services server.

The CSA receives the user's digital signature 110 and requests the user's access rights from the system 112. Then the CSA determines whether the user has valid access rights to any services in the system 114. If the user has no access rights, then access is denied to the services and the user is not allowed to view a listing of the services 116.

If the user has access rights, then the CSA generates a message requesting a list of authorized services for this user 118 from the CSA database. A message digest (MD) is then created for the request for the list of authorized services 120. A message digest is essentially a one way hash-key created from the contents of the message. The message cannot be regenerated from the hash-key but the identical message will always generate exactly the same hash-key. When the "hashed" message is received by a recipient, the hash-key can be regenerated using the same hashing algorithm. If the MD for the received message is the same as MD sent with the message, then the message has not been tampered with.

The CSA also generates a random 128-bit encryption session key for the communication session 122. The CSA then encrypts the message (requesting the list of services) using the session key 124, and the MD using the user's private key 126. The message can also be signed with the user's digital signature. The CSA encrypts the session key with the public key of the SSA 128. The encrypted message, MD, and session key are then sent to the SSA 130.

The SSA 104 decrypts the session key with its private key 132 and then decrypts the message with the decrypted session key 134. The user's name can also be extracted from the digital signature. The MD is decrypted with the user's public key 136. A new MD is generated for the message 138 and compared to the MD that was received 140. If the MDs do not match then the message has been altered 142 and error processing takes place 144.

Figure 4A:
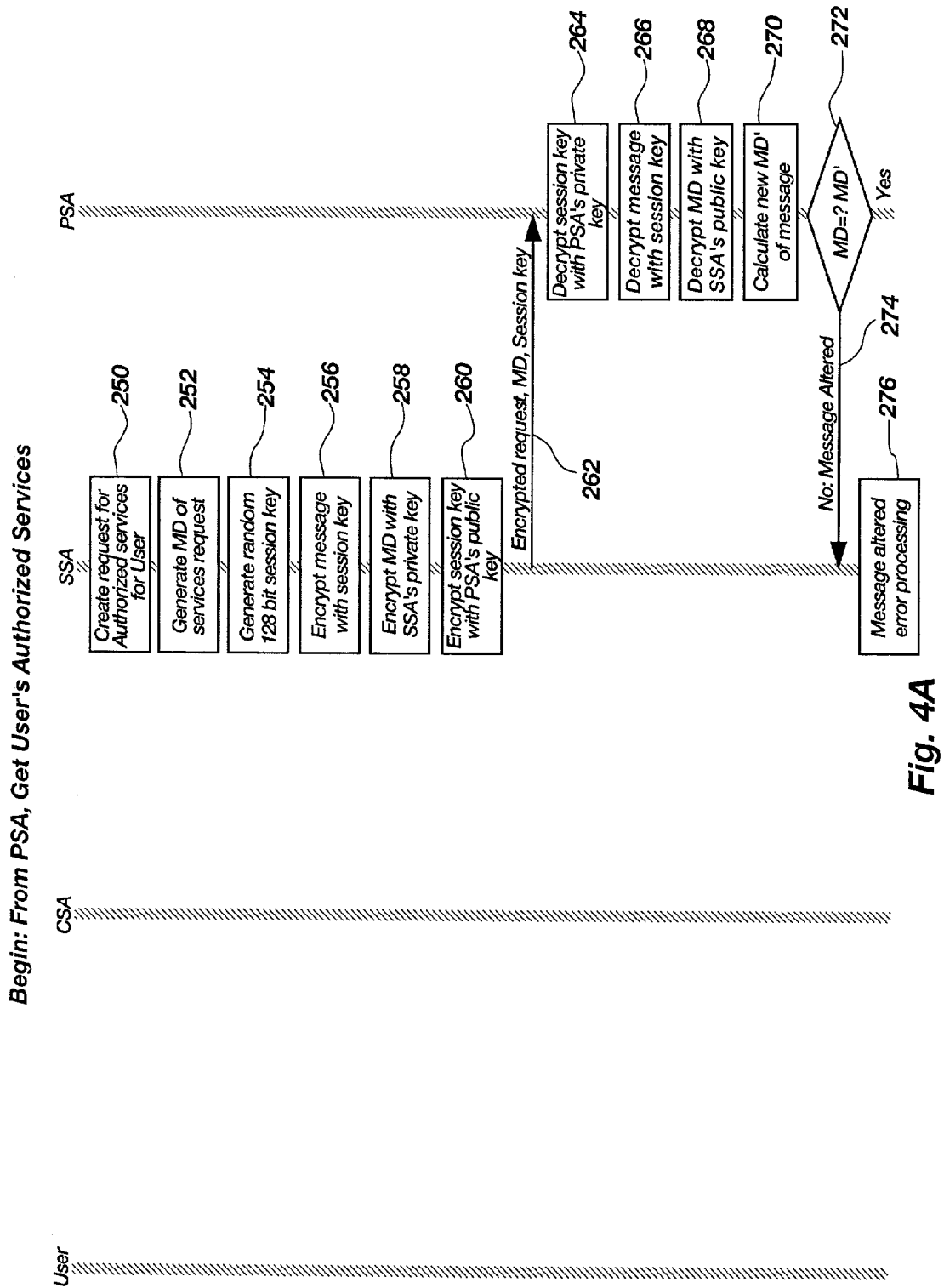
FIG. 4A is a flow chart illustrating the retrieval of a user's authorized services from a permissions software agent.
Figure 4B:
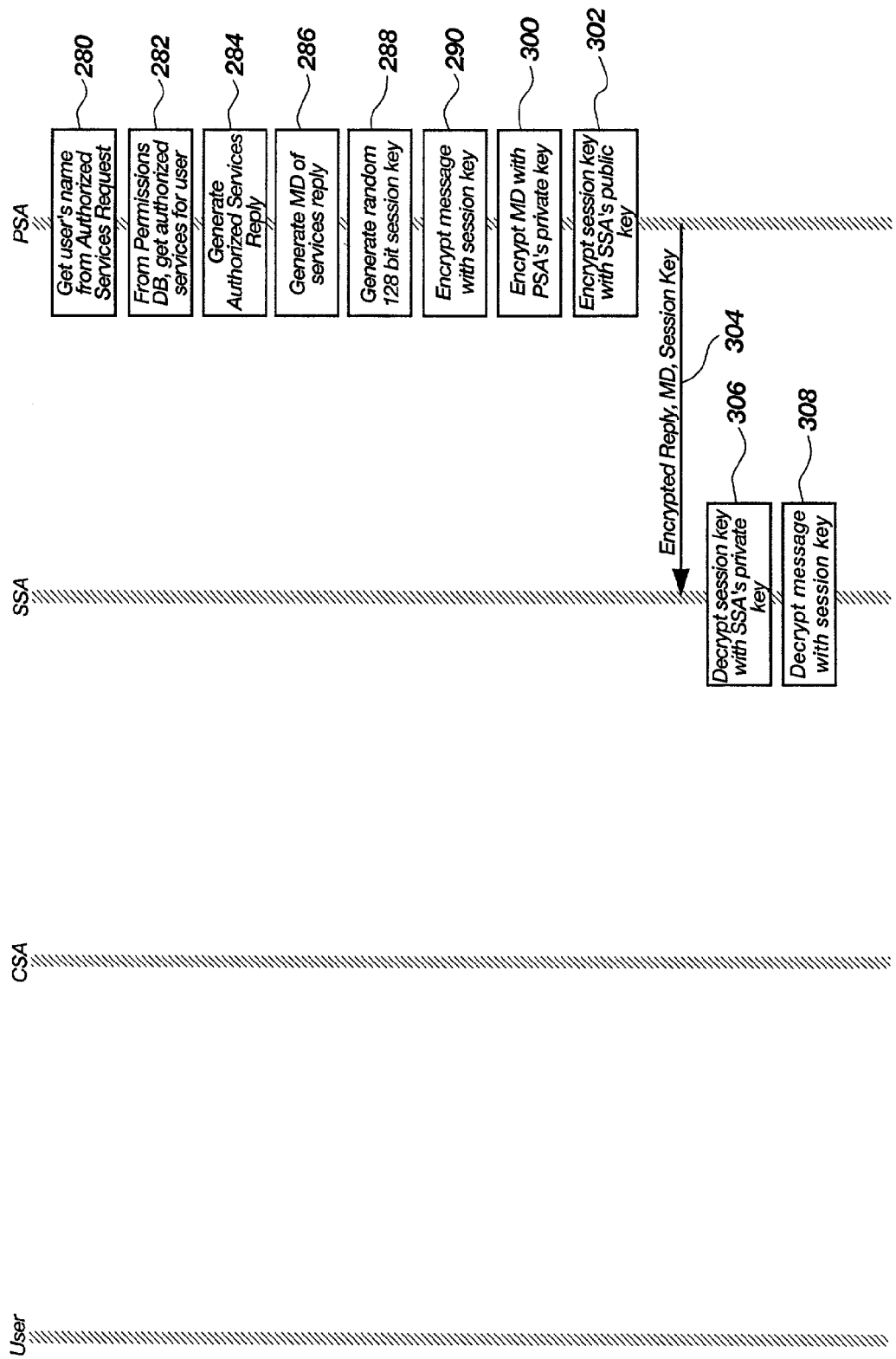
FIG. 4B is a continuation of the flow chart in FIG. 4A.
Figure 4C:
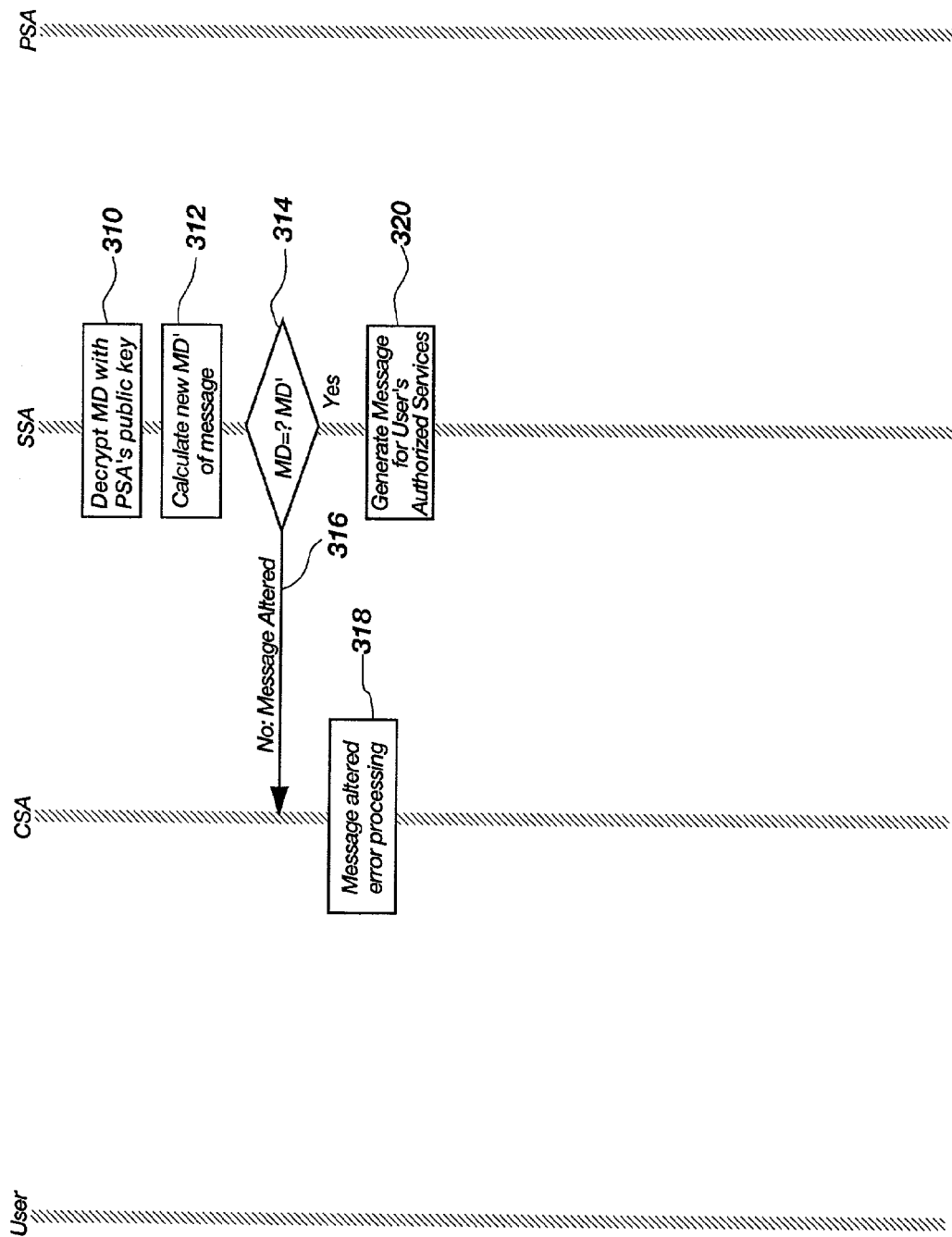
FIG. 4C is a continuation of the flow charts in FIGS. 4A-B and illustrates when the user's authorized services have been retrieved.

If the MDs match, the list of user's authorized services is retrieved from the Permissions Software Agent 146 (as described in more detail in FIGS. 4A-C). With the list of authorized services, a message is generated with the authorized services for this user. An MD is also generated for the services message 148. A random 128 bit session key is generated 150 and the services message is encrypted with the session key 152. The MD is encrypted with the user's public key 154 and the session key is also encrypted with the CSA's public key 156. The services message is then sent to the CSA 158.

The CSA decrypts the session key 160 using its private key and then decrypts the services message with the session key 162. The MD is decrypted with the user's private key 164 and a new MD is calculated and compared with the MD that was received 168. If the MDs match, then the list of authorized list of services is displayed for the user 172 otherwise message error processing occurs 170. The CSA can generate an interface window showing the list of services that the user has access to (e.g., through a browser window). At this point, the user has received secure access to a list of authorized services.

Figure 3A:
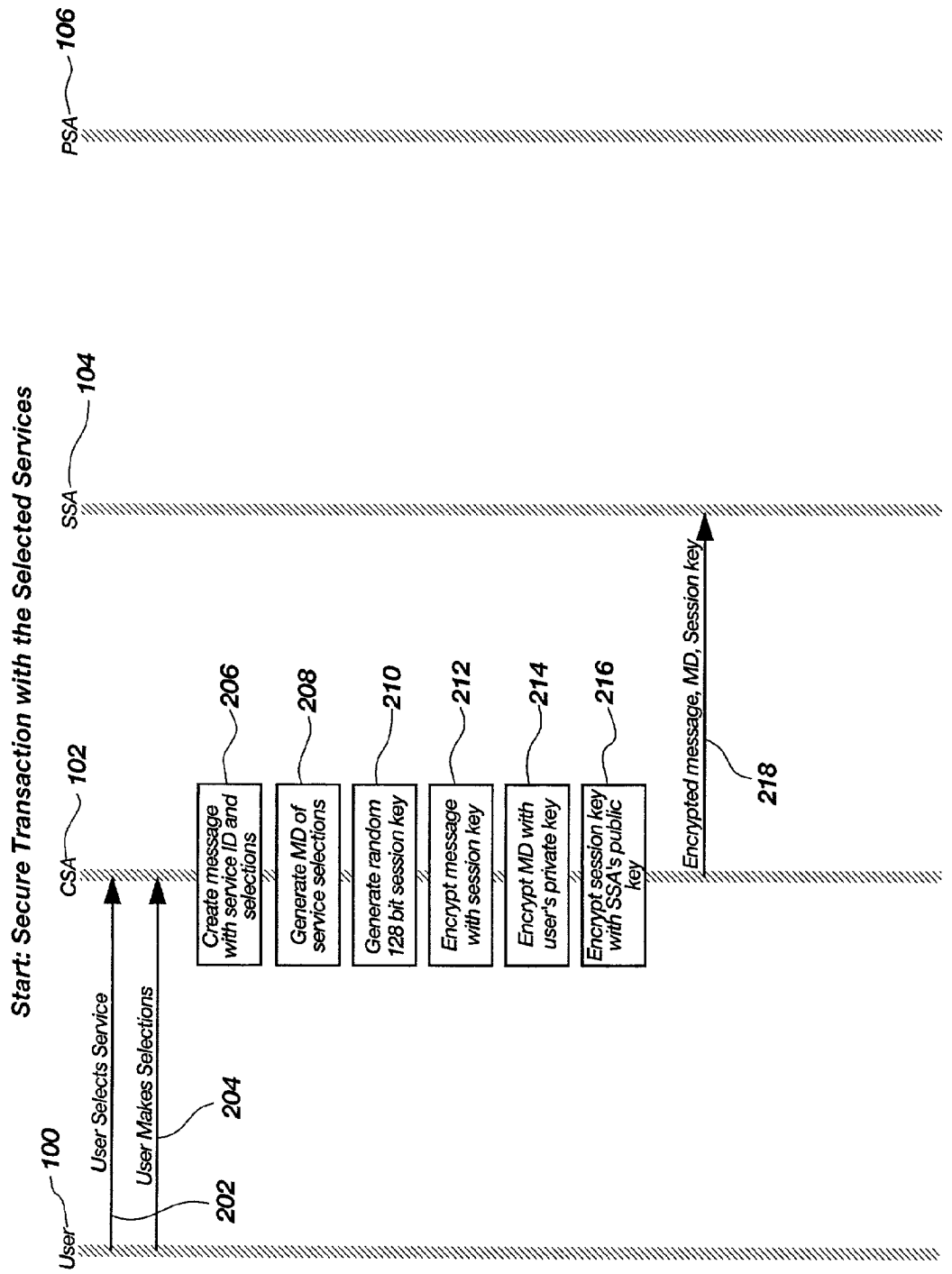
FIG. 3A is a flow chart showing the beginning of a secure transaction with a selected service.

To provide a secure transaction with the selected service (see FIG. 3A), the user 100 selects the service they desire to use 202. The user also makes additional processing selections 204 that relate to certain options that may be selected for the service such as multiple printing copies or color options, etc. The CSA 102 creates a message with the service ID of the selected service(s) and selected options 206 and can attach a data file. A message digest (MD) of the service selection message is made 208 and a random 128-bit session key is also created 210. The message containing the selected service and options is encrypted with the 128-bit session key 212, and the message digest is encrypted with the user's private key 214. The random session key is also encrypted with the SSA's public key 216. Next, the encrypted message, encrypted MD, and encrypted session key are sent to the SSA 218.

Figure 3B:
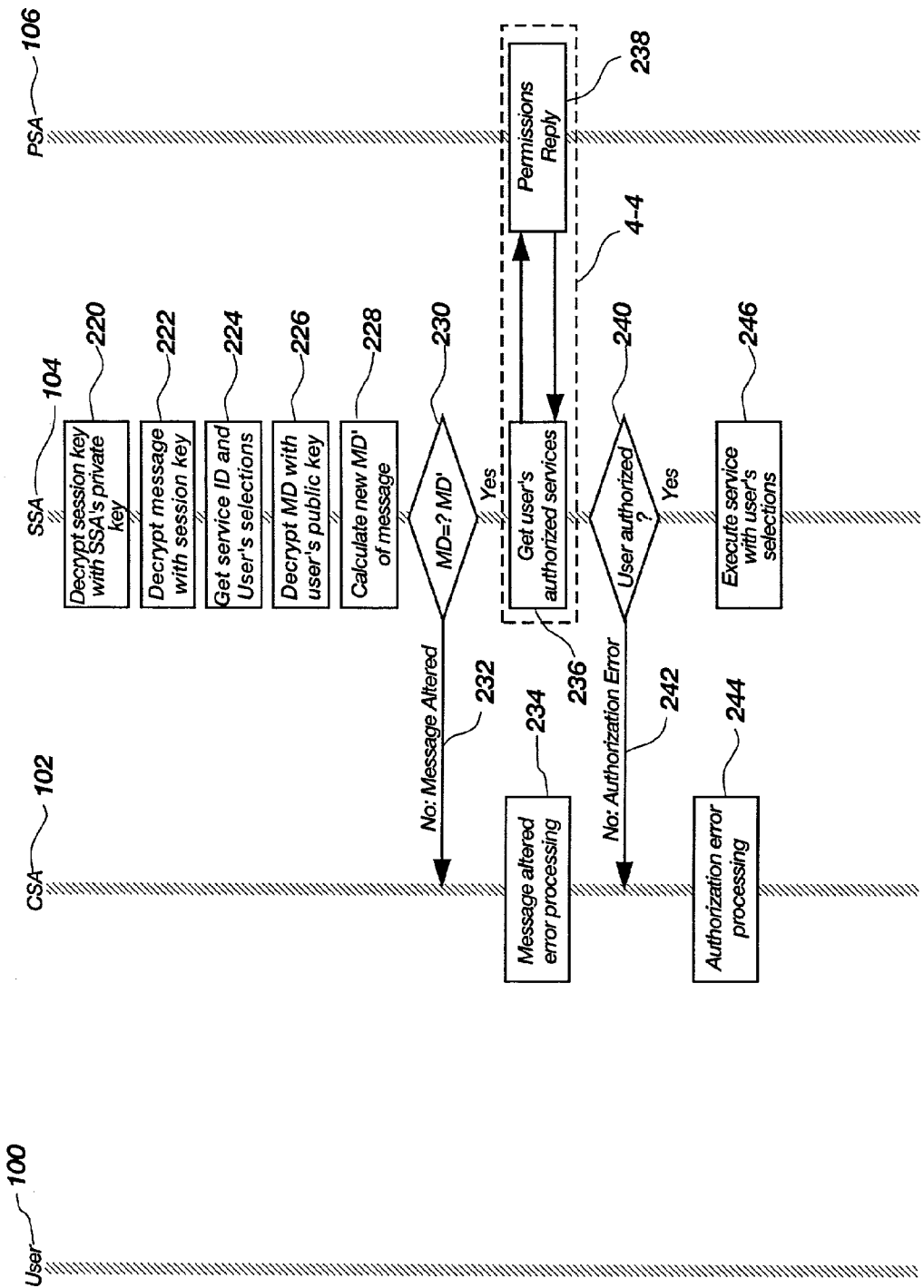
FIG. 3B is a continuation of the flow chart in FIG. 3A and shows when a user has received a secure transaction with the selected service.

Referring to FIG. 3B, the SSA 104 decrypts the session key with the SSA's private encryption key 220, and decrypts the message containing the services and service options with the session key 222. The service ID and the user selections that were sent with the message are used by the SSA 224. The MD is then decrypted with the user's public key 226 and a new MD of the message 228 is calculated. If the MD sent is equal to the new calculated MD 230, then the process continues. If the message digest that was created is not the same 232, then the message was altered and error processing now commences 234.

At this point, the SSA determines whether the user is authorized to use the requested service(s) 236. This authorization is performed by making a permissions request to the PSA 106, and a permissions reply 238 is returned to the SSA. The dotted line 4-4 depicted in FIG. 3B refers to FIGS. 4A-C, which will be discussed in further detail below.

If the user is authorized 240, then the SSA executes the service with the user's selections 246. If the user is not authorized 242, then error processing begins 244. As mentioned before, the types of services that may be executed are printing services, communication services, display services, processing services, or even physical services that are initiated through an Internet website. At this point, the user has received a secure transaction with the selected service. This method for providing a secure service is also significant because the listing of the selected services is encrypted or protected. This means that others on the network cannot see what services a user has selected or even what services are available. Once the service has been selected, the authorization for the service through the PSA is also protected.

FIG. 4A illustrates the retrieval of user-authorized services from the permission services agent (PSA). A services software agent (SSA) creates a services request message for the authorized services for the user 250. In other words, this means that the SSA will verify from the PSA exactly which services the user has authority to use. This step provides added security if the user's authorization has changed between the time of the original request and the execution of the service. A message digest (MD) of the services request message is then generated 252 and a random 128-bit session key 254 is generated. The SSA then encrypts the message with the 128-bit session key 256 and encrypts the message digest with the SSA's private key 258. The session key is also encrypted with the PSA's public key 260.

These multiple layers of encryption are important because a computer hacker or imposter would need to break at least two levels of encryption to actually read the message. A third level of encryption protects the message from tampering with because the MD is also encrypted. In this embodiment, a relatively strong encryption is used with the public/private key encryption method and relatively strong 128-bit encryption is used with the session and message encryption.

The encrypted service request message, MD and session key are then transferred to the PSA 262. The PSA decrypts the session key with the PSA's private key 264, which enables it to decrypt the message with the decrypted session key 266. Next, the PSA decrypts the MD with the SSA's public key 268 and a new MD is calculated for the message 270. The PSA compares the MDs to determine if the message was altered 272. If the message was altered, 274, then the message altered error processing begins 276 and the user is informed of this alteration.

In FIG. 4B, when the MDs match, the PSA gets the user's name from the authorized services request that was received 280. The authorized services for the user are then retrieved from the PSA's permission database 282. An authorized services reply is generated 284.

An MD of the services reply is created by the PSA 286 and a random 128-bit session key is generated 288. The system then encrypts the message with the session key 290 that was just generated and the MD is encrypted with the PSA's private key 300. Finally, the session key is encrypted with the SSA's public key 302. The encrypted authorized services reply, MD, and session key are then transmitted to the SSA 304. The SSA decrypts the session key with the SSA's private key 306 and decrypts the message with the session key 308.

As illustrated in FIG. 4C, the SSA decrypts the MD with the PSA's public key 310 and calculates a new MD of the message 312. As was done previously, the MDs are compared 314 and if the message was altered 316, then error processing occurs 318. If the MDs are the same, then the SSA knows that it has received an unmodified message for the user's authorized services 320. Using the MD also protects against electronic corruption.

Figure 5A:
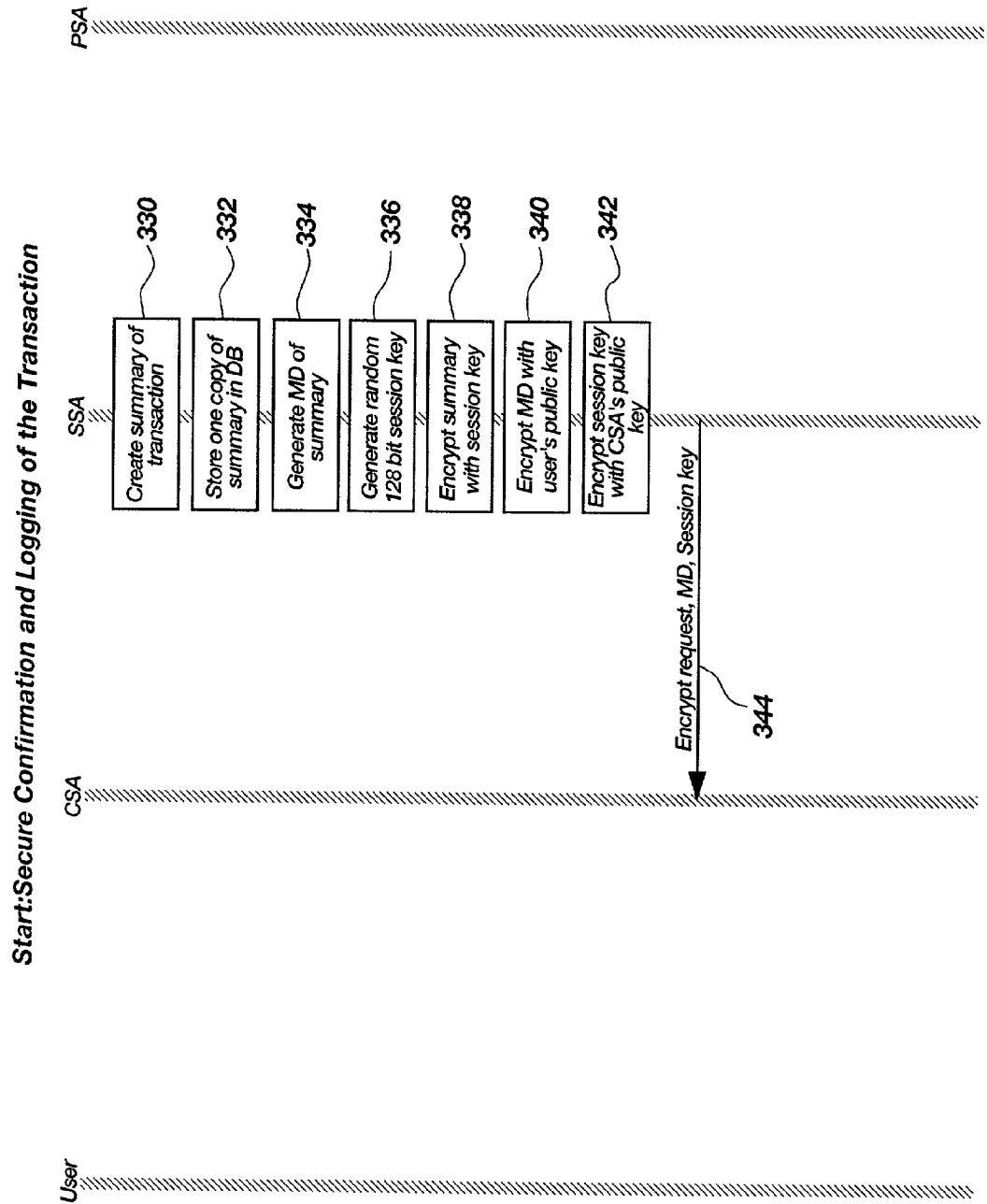
FIG. 5A is a flow chart showing the beginning of the secure confirmation and logging of a transaction.

FIG. 5A illustrates the secure confirmation and logging of a transaction that has previously taken place within the services system. Specifically, the SSA creates a summary of the services transaction 330 and stores one copy of the transaction summary in a database on the SSA 332. An MD is then created for the transaction summary 334 and a random 128-bit session key is created 336. The transaction summary is encrypted with the session key 338 and the MD is encrypted with the user's public key 340. Finally, the session key is encrypted with the CSA's public key 342 and the encrypted summary, message digest and session key are transmitted to the CSA 344.

Figure 5B:
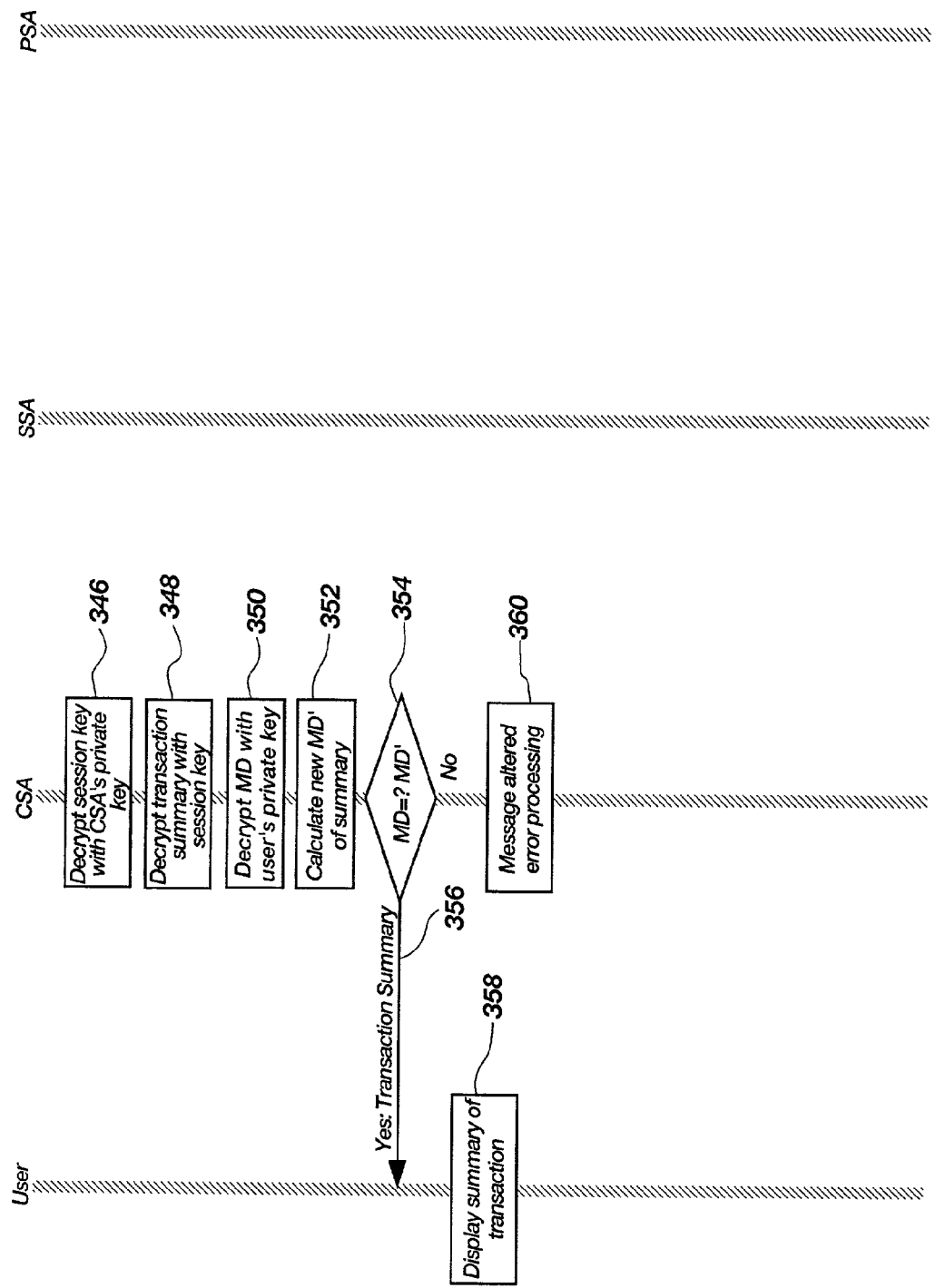
FIG. 5B is a continuation of the flow chart in FIG. 5A and illustrates that the user has received secure confirmation and logging of a transaction.

After the CSA has received the encrypted transaction summary, as in FIG. 5B, the CSA decrypts the session key with the CSA's private key 346. Further, the transaction summary is decrypted with the session key 348 and the MD is decrypted with the user's private key 350. A new MD is computed for the transaction summary 352 and compared against the MD that was received 354. If the MDs are the same, the transaction summary will be sent to the user 356. This transaction summary message allows a summary of the transaction to be displayed for the user 358. If the MDs do not match, error processing is initiated 360 and the user is informed that someone has tampered with their session. At this point, the user has received secure confirmation and logging of the transaction.

Figure 6A:
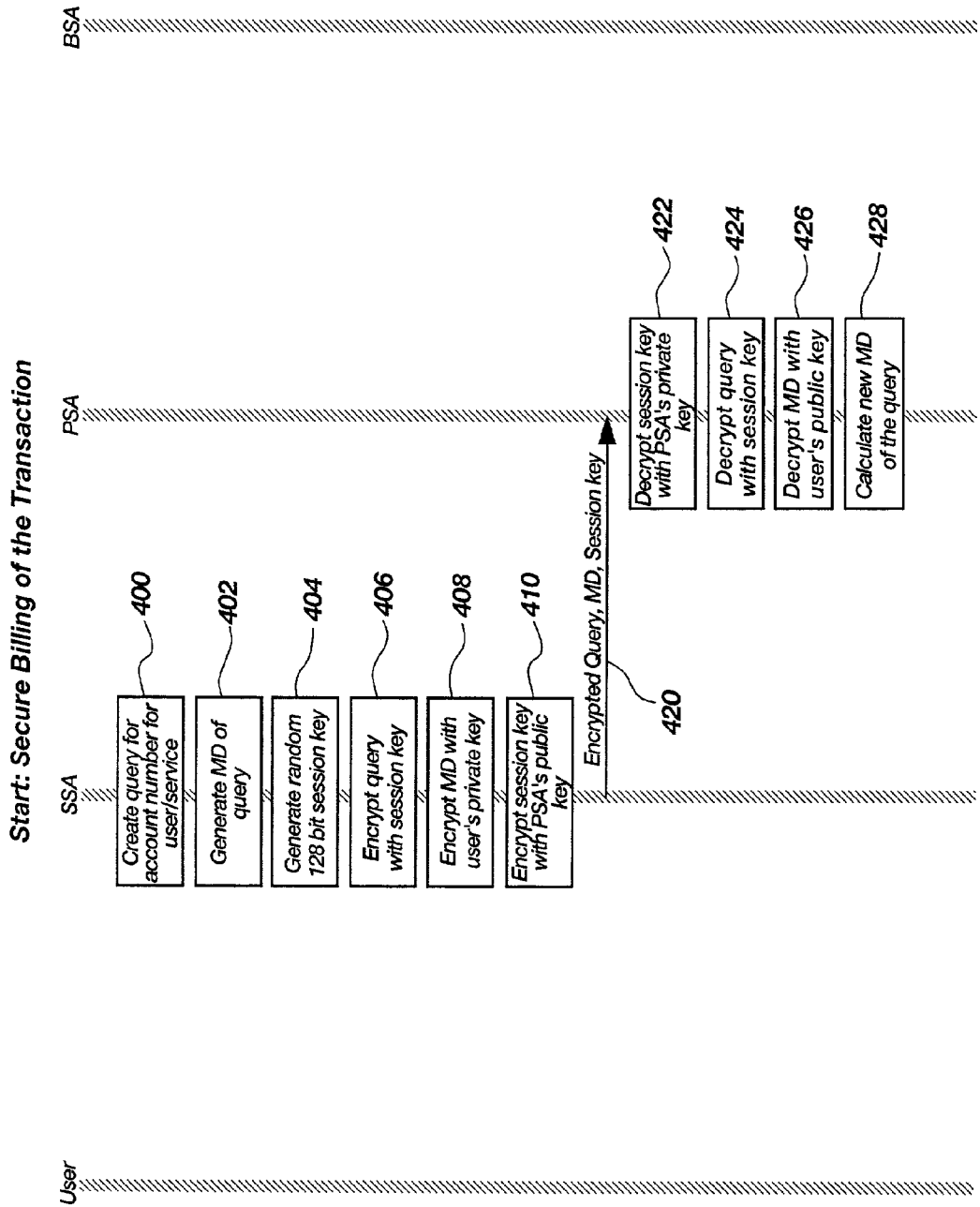
FIG. 6A is a flow chart illustrating the beginning of a secure billing of a transaction.
Figure 6B:
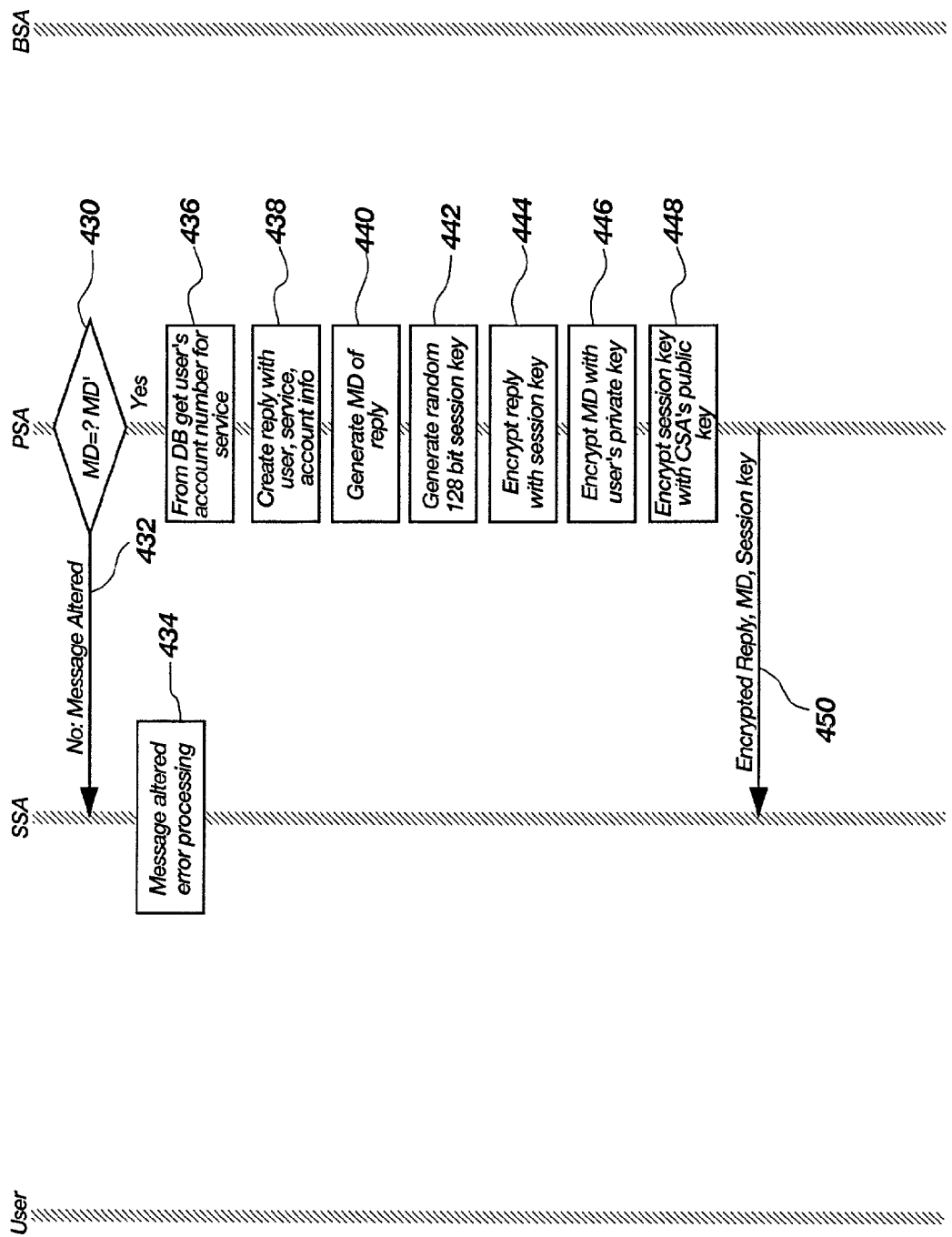
FIG. 6B is a continuation of the flow chart in FIG. 6A.

FIG. 6A illustrates the secure billing of a services transaction as described by the present invention. A services software agent (SSA) creates a query to retrieve an account number for a user and the service they have used through the SSA 400. An MD is created for the query 402, along with a random 128-bit session key 404. The query is encrypted with the session key 406 and the MD of the query is encrypted with the user's private key 408. Then the session key is encrypted with the PSA's (Permissions Software Agent) public key 410 and the encrypted query, MD, and session key are sent to the PSA. The PSA decrypts the session key 422, decrypts the query 424, and decrypts the MD with the user's public key 426. A new message digest for the query is created 428, and the message digest that was received as compared to the message digest that was just created 430.

If the message was altered 432, then error processing begins 434. If the message has not been altered, the processing continues. At this point, the PSA retrieves the user's account number for the service from a database on the PSA 436. With the account number, a reply is created that includes the user name, the service, and the account information 438. After the reply has been created an MD of the reply 440 is generated, and a random 128-bit session key is generated 442. Next, the reply is encrypted with the session key 444, the MD is encrypted with the user's public key 446, and the session key is encrypted with the CSA's public key 448. The encrypted reply and its keys are sent back to the SSA 450.

Referring now to FIG. 6C, the SSA decrypts the session key with the CSA's private key 452 and decrypts the reply with the session key 454. The MD is also decrypted with the user's private key 456. The SSA then performs a routine to determine if the message has been tampered with. This includes the steps of calculating a new MD 458, comparing the MDs 460, and invoking error processing if the MD has been altered 462. When the message digests match 464, then billing will continue.

At this point the SSA creates a billing entry with the user name, service name, account number and amount to be billed 466. The use of this step when combined with the request of the account number from the PSA is a powerful step to avoid tampering with the billing system. This is because an encrypted message is sent to the PSA to retrieve the service billing account number and the user is also verified again with the SSA after that account number has been received. The user name and service amount (or cost) are stored on the SSA, while the user's name and the billing account numbers can be stored on the PSA. In order to send a valid billing account entry to the billing services agent, the security of both of these servers would have to be breached and a message would have to be sent through both servers to provide a valid billing entry. Since the SSA is going to transmit the billing entry, a MD is created of the billing entry 468 and a random 128-bit session key is created 470.

Figure 6D:
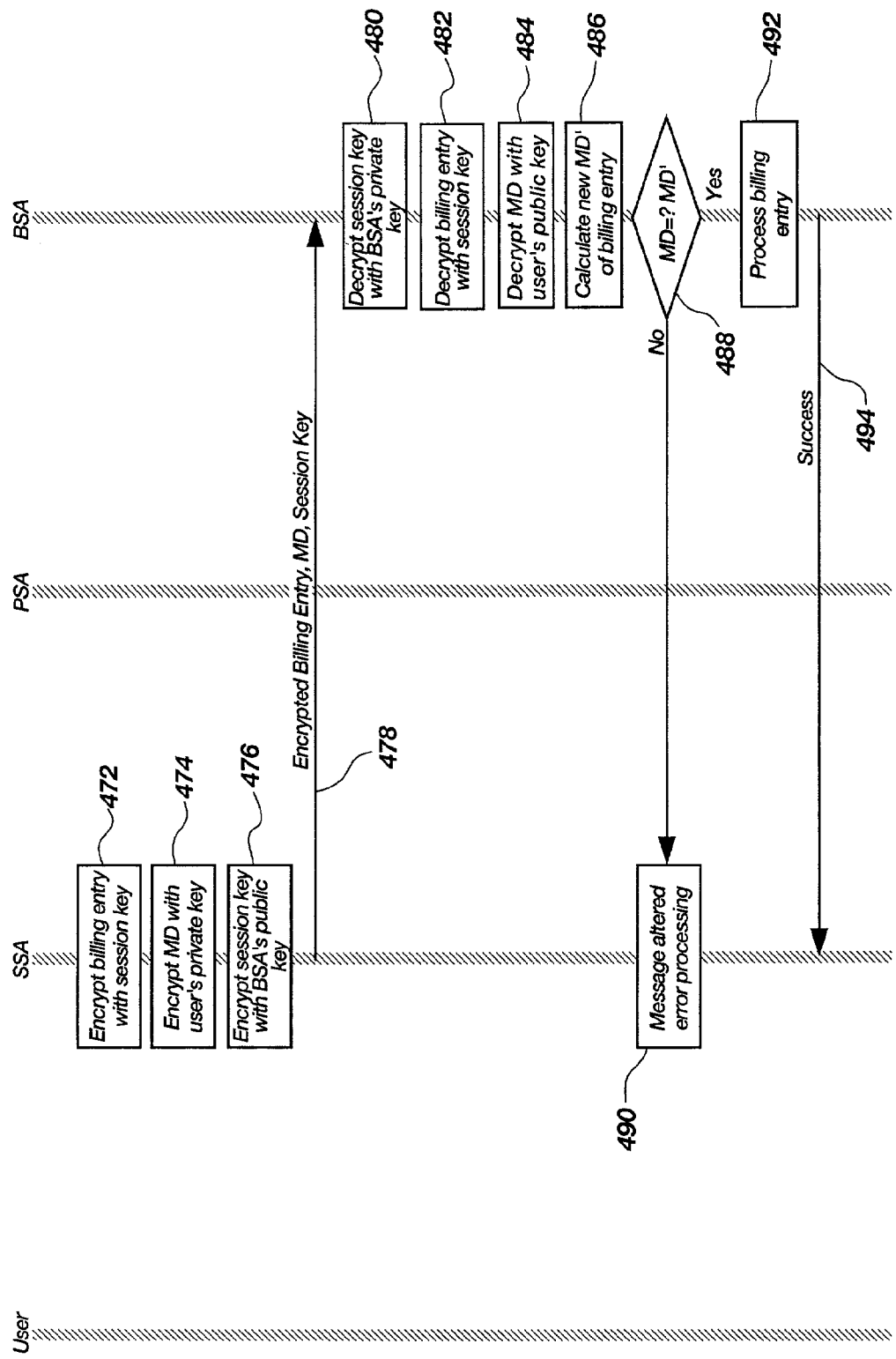
FIG. 6D is a continuation of FIGS. 6A-C and shows that a user has received a secure billing of a transaction.

Referring to FIG. 6D, additional preparation for the transmittal of the billing entry is also required. The billing entry is encrypted with the session key 472 and the MD is encrypted with the user's private key 474. In addition, the session key is encrypted with the BSA's public key 476. The encrypted billing entry, MD and session key are transmitted to the Billing Software Agent (BSA) 478.

The BSA then decrypts the message using the following steps: decrypting the session key with the BSA's private key 480, decrypting the billing entry with the session key 482, and decrypting the message digest with the user's public key 484. The BSA creates a new MD 486 from the billing entry message and compares the MDs 488 to determine whether the billing entry has been altered 490. If the billing entry has not been altered 492, then billing success is reported 494 to the SSA. At this point, the user has received secure billing of the transaction. It is also important to point out that in addition to the successful confirmation delivered to the SSA, a successful message can also be sent to the CSA to inform the user that the billing is completed and the service has been billed to their account. End user reviews help to ensure that that incorrect billing amount or incorrect user ID's are not sent to the BSA.

It is to be understood that the above-described arrangements are only illustrative of the application for the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in form, function and manner of operation, assembly and use may be made, without departing from the principles and concepts of the invention as set forth in the claims.

What is claimed is:

1. A method for providing secure billing of network accessible services provided to a user, comprising:
   generating a billing request, having a user name, from a services software agent on a services server after the network accessible services have been completed via the services software agent;
   sending the billing request from the services software agent to a permissions software agent having group permissions and access rights for devices and services specified by a system administrator;
   retrieving at the permissions software agent a user's billing account based on the user name and a service name looked up in the permissions software agent on a system server;
   creating a billing reply by the permissions software agent that includes a user name, service name and account number;
   sending the billing reply from the permissions software agent to the services software agent which requests a charge amount for the network accessible services;
   creating an accounting message in the services software agent that contains the user name, service name, account number and charge amount; and
   sending the accounting message from the services software agent to a billing software agent on a billing server.

* * * * *